United States Patent
Nozato et al.

(10) Patent No.: US 9,604,884 B2
(45) Date of Patent: Mar. 28, 2017

(54) COMPOSITE MATERIAL AND METHOD FOR PRODUCING THE SAME

(71) Applicants: SEKISUI CHEMICAL CO., LTD., Osaka, Osaka (JP); NATIONAL UNIVERSITY CORPORATION KUMAMOTO UNIVERSITY, Kumamoto, Kumamoto (JP)

(72) Inventors: Shoji Nozato, Osaka (JP); Akira Nakasuga, Osaka (JP); Hirotaka Ihara, Kumamoto (JP); Makoto Takafuji, Kumamoto (JP); Hullathy Subban Ganapathy, Kumamoto (JP); Rika Fukuda, Kumamoto (JP)

(73) Assignees: SEKISUI CHEMICAL CO., LTD., Osaka (JP); NATIONAL UNIVERSITY CORPORATION KUMAMOTO UNIVERSITY, Kumamoto (JP)

( * ) Notice: Subject to any disclaimer, the term of this patent is extended or adjusted under 35 U.S.C. 154(b) by 0 days.

(21) Appl. No.: 14/415,573

(22) PCT Filed: Aug. 30, 2013

(86) PCT No.: PCT/JP2013/073340
§ 371 (c)(1),
(2) Date: Jan. 16, 2015

(87) PCT Pub. No.: WO2014/034855
PCT Pub. Date: Mar. 6, 2014

(65) Prior Publication Data
US 2015/0210599 A1    Jul. 30, 2015

(30) Foreign Application Priority Data
Sep. 3, 2012 (JP) .................. 2012-193089

(51) Int. Cl.
*B82Y 30/00* (2011.01)
*C04B 35/524* (2006.01)
(Continued)

(52) U.S. Cl.
CPC ............ *C04B 35/524* (2013.01); *B82Y 30/00* (2013.01); *B82Y 40/00* (2013.01); *C01B 31/0438* (2013.01); *Y10T 428/30* (2015.01)

(58) Field of Classification Search
USPC ......................................... 427/570; 428/408
See application file for complete search history.

(56) References Cited

U.S. PATENT DOCUMENTS

2009/0059474 A1    3/2009  Zhamu et al.
2010/0096595 A1    4/2010  Prud'Homme et al.
(Continued)

FOREIGN PATENT DOCUMENTS

CN    102344700 A    2/2012
JP    2003-277471 A    10/2003
(Continued)

OTHER PUBLICATIONS

International Search Report for the Application No. PCT/JP2013/073340 mailed Dec. 10, 2013.
(Continued)

*Primary Examiner* — Archene Turner
(74) *Attorney, Agent, or Firm* — Cheng Law Group, PLLC

(57) ABSTRACT

There is provided a composite material having excellent adhesion between a resin and a graphene-like carbon material and a method for producing the same. A composite material comprising a substrate comprising a resin, and a graphene-like carbon material layer provided so as to cover at least part of a surface of the substrate, wherein the graphene-like carbon material layer is composed of a gra-
(Continued)

phene-like carbon material obtained by pyrolyzing a polymer in a composition in which the polymer is fixed to graphite or primary exfoliated graphite.

7 Claims, 13 Drawing Sheets

(51) Int. Cl.
*C01B 31/04* (2006.01)
*B82Y 40/00* (2011.01)

(56) References Cited

U.S. PATENT DOCUMENTS

| | | | |
|---|---|---|---|
| 2010/0147188 A1 | 6/2010 | Mamak et al. | |
| 2010/0247892 A1* | 9/2010 | Lee | H01B 1/24 428/221 |
| 2011/0014457 A1* | 1/2011 | Quitoriano | B32B 9/00 252/502 |
| 2011/0123776 A1* | 5/2011 | Shin | C23C 16/26 427/249.1 |
| 2011/0165321 A1 | 7/2011 | Zhamu et al. | |
| 2012/0082787 A1 | 4/2012 | Fujita | |
| 2013/0244038 A1 | 9/2013 | Nozato et al. | |
| 2013/0270119 A1 | 10/2013 | Wada et al. | |
| 2013/0296498 A1 | 11/2013 | Nakasuga et al. | |

FOREIGN PATENT DOCUMENTS

| | | | |
|---|---|---|---|
| JP | 2008-201635 | * | 9/2008 |
| JP | 2010-506013 A | | 2/2010 |
| JP | 2011-066057 | * | 3/2011 |
| JP | 2011-513167 A | | 4/2011 |
| JP | 2011-190166 A | | 9/2011 |
| WO | WO-2010/110153 A1 | | 9/2010 |
| WO | WO-2012/073861 A1 | | 6/2012 |
| WO | WO-2012/105344 A1 | | 8/2012 |
| WO | WO-2012/165372 A1 | | 12/2012 |

OTHER PUBLICATIONS

Written Opinion of the International Searching Authority (PCT/ISA/237) for Application No. PCT/JP2013/073340 mailed Dec. 10, 2013.

Li, Yunxing et al., "Colloid Thermodynamic Effect as the Universal Driving Force for Fabricating Various Functional Composite Particles", Langmuir, 2012, vol. 28, pp. 12704-12710.

Choi, Eun-Kyoung et al., "High-yield exfoliation of three-dimensional graphite into two-dimensional graphene-like sheets", Chemical Communications, 2010, vol. 46, No. 34, pp. 6320-6322.

Ju, Sang Ah et al., "Graphene-Wrapped Hybrid Spheres of Electrical Conductivity", ACS Applied Materials & Interfaces, 2011, vol. 3, pp. 2904-2911.

Written Opinion of the International Searching Authority (PCT/ISA/237) for Application No. PCT/JP2013/073340 mailed Dec. 10, 2013 (English Translation mailed Mar. 12, 2015).

The First Office Action for the Application No. 201380045696.3 from The State Intellectual Property Office of the People's Republic of China dated Jan. 22, 2016.

Supplementary European Search Report for the Application No. EP 13 83 3721 dated Apr. 6, 2016.

Korobeinyk, Alina V. et al., "Exfoliated production of single- and multi-layer graphenes and carbon nanofibres from the carbonisation of a co-polymer", Carbon, Elsevier, 2012, vol. 50, No. 5, pp. 2018-2025.

* cited by examiner

COMPOSITE MATERIAL AND METHOD FOR PRODUCING THE SAME

TECHNICAL FIELD

The present invention relates to a composite material of a resin and a graphene-like carbon material such as graphene or exfoliated graphite and more particularly to a composite material in which the adhesion of a graphene-like carbon material to a substrate comprising a resin is increased and a method for producing the same.

BACKGROUND ART

Conventionally, carbon materials such as graphite, carbon nanotubes, carbon fibers, or carbon particles have been widely used as reinforcing agents or fillers in resins. In addition, in recent years, exfoliated graphite having a smaller number of stacked layers of graphene obtained by exfoliating graphite has attracted more attention.

As composite materials of the carbon materials as described above and resins, for example, a composite material is known which is obtained by dispersing a carbon material such as carbon fibers in an epoxy resin as shown in the following Patent Literature 1.

CITATION LIST

Patent Literature

Patent Literature 1: Japanese Patent Laid-Open No. 2003-277471

SUMMARY OF INVENTION

Technical Problem

However, a problem of conventional composite materials of resins and carbon materials is that the adhesion strength between the resin and the carbon material is not sufficient. For example, in a composite material obtained by dispersing a carbon material in a resin as described in Patent Literature 1, the improvement of physical properties is promoted by the added carbon material, but the adhesion strength to the carbon material is not sufficient.

It is an object of the present invention to eliminate the disadvantage of conventional art described above and provide a composite material having excellent adhesion between a resin and a graphene-like carbon material and a method for producing the same.

Solution to Problem

A composite material according to the present invention comprises a substrate and a graphene-like carbon material layer. The substrate comprises a resin. The graphene-like carbon material layer is provided so as to cover at least part of the substrate surface. The graphene-like carbon material layer is composed of a graphene-like carbon material. The graphene-like carbon material is obtained by pyrolyzing a polymer in a composition in which the polymer is fixed to graphite or primary exfoliated graphite.

In a particular aspect of the composite material according to the present invention, the graphene-like carbon material comprises the polymer. A pyrolysis initiation temperature and pyrolysis end temperature of the polymer contained in the graphene-like carbon material are higher than a pyrolysis initiation temperature and pyrolysis end temperature of the polymer before the fixation, respectively. Therefore, the electrical conductivity of the graphene-like carbon material is not high, and the electrical conductivity can be suppressed.

In another particular aspect of the composite material according to the present invention, the graphene-like carbon material does not comprise the polymer. Therefore, the electrical conductivity of the graphene-like carbon material increases, and therefore, a composite material having high electrical conductivity can be provided.

In another particular aspect of the composite material according to the present invention, part of the graphene-like carbon material enters an interior of the substrate from the surface of the substrate. Therefore, the adhesion between both is increased much more.

In another particular aspect of the composite material according to the present invention, the substrate comprising a resin is resin fine particles, and the graphene-like carbon material layer is formed so as to cover outer surfaces of the resin fine particles. In this case, the outer surfaces of the resin fine particles are covered with the graphene-like carbon material layer, and part of the graphene-like carbon material enters the resin fine particle surfaces, and therefore, the adhesion between the resin fine particles and the graphene-like carbon material layer is increased. Moreover, the composite material in the form of fine particles on the graphene-like carbon material layer surface is less likely to aggregate. Therefore, it can be handled as the so-called free flowing powder.

In another particular aspect of the composite material according to the present invention, the substrate comprising a resin is a sheet-like substrate, and the graphene-like carbon material layer is provided on at least one surface of the sheet-like substrate. In this case, a sheet-like composite material in which the adhesion of a carbon material layer to a sheet-like substrate is excellent can be provided according to the present invention.

In the composite material according to the present invention, preferably, the graphene-like carbon material comprises graphene or exfoliated graphite. The graphene or exfoliated graphite has a large aspect ratio and has a small number of stacked layers of graphene, and therefore, the physical properties of the composite material can be increased by the addition of a small amount of the graphene or exfoliated graphite.

A method for producing a composite material according to the present invention is a method for producing a composite material formed according to the present invention and comprises steps of providing a substrate comprising a resin, and a graphene-like carbon material; and bringing the graphene-like carbon material into contact with at least part of a surface of the substrate comprising a resin, and performing heating while allowing a fluid in a supercritical or subcritical state to act. The step of providing a graphene carbon material is performed by pyrolyzing a polymer in a composition in which the polymer is fixed to graphite or primary exfoliated graphite.

In the production method according to the present invention, preferably, as the supercritical or subcritical fluid, $CO_2$ in a supercritical or subcritical state is used. $CO_2$ is in a supercritical state at a temperature of about 31.1° C. and a pressure of about 7.52 Mpa. Therefore, the surface of the substrate comprising a resin can be swollen under milder conditions than with $H_2O$ and the like. Therefore, also when a resin having low glass transition temperature is used, the composite material of the present invention can be reliably obtained.

Advantageous Effects of Invention

In the composite material according to the present invention, the graphene-like carbon adheres to the substrate comprising a resin, and therefore, a composite material having excellent adhesion between a graphene-like carbon material layer and a substrate can be obtained.

In addition, according to the production method according to the present invention, by performing heating while allowing a fluid in a supercritical or subcritical state to act on a resin, a graphene-like carbon material layer is formed on the resin surface so that the graphene-like carbon adheres to the surface of the substrate comprising the resin. Therefore, the composite material of the present invention having a graphene-like carbon material layer having excellent adhesion to a substrate comprising a resin can be obtained. In addition, in the production method of the present invention, the graphene-like carbon material layer is formed on the substrate surface as described above, and therefore, the shape of the substrate is also not particularly limited. Therefore, the graphene-like carbon material layer can be easily formed on the surfaces of substrates comprising a resin having not only shapes such as the form of fine particles such as resin fine particles and a sheet-like substrate but also complicated shapes, according to the present invention.

In addition, carbon material fine particles, a material to be dispersed, have high aggregation properties and are not easy to uniformly disperse and attach. By contrast, in the production method of the invention, carbon material fine particles can be easily adhered to a substrate surface.

DESCRIPTION OF EMBODIMENTS

Figure 1:
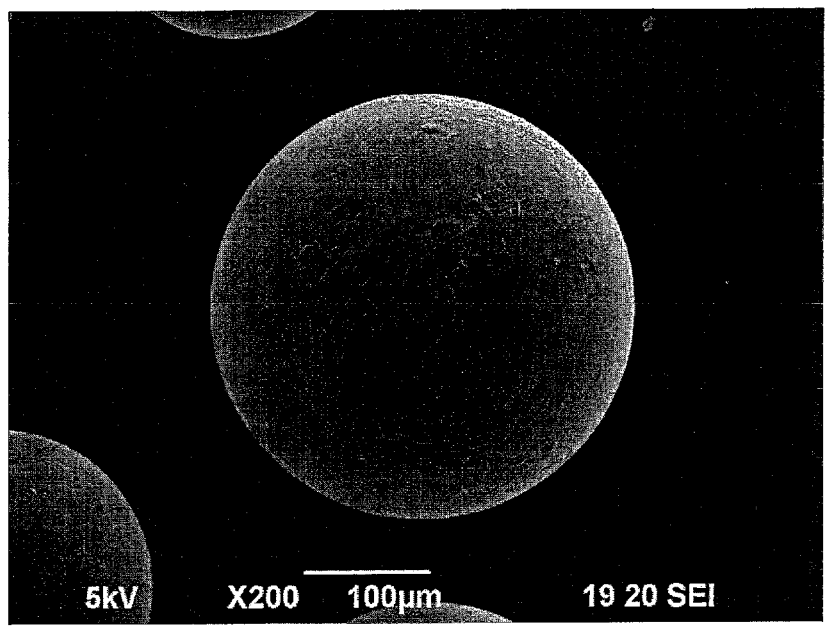
FIG. 1 is a scanning electron micrograph (200×) of a fine particle after 1 g of polystyrene fine particles (product number S-20 manufactured by Sekisui Plastics Co., Ltd.) and 0.001 g of exfoliated graphite obtained in Experimental Example 1 are mixed, and supercritical carbon dioxide (50° C., 27.6 MPa) is allowed to act for 6 hours.

The present invention will be clarified below by describing specific embodiments of the present invention.

(Substrate Comprising Resin)

In a composite material and a method for producing the same according to the present invention, a substrate comprising a resin is used. For the resin constituting the substrate, an appropriate resin can be used whose surface can be made soft by performing heating while allowing a fluid in a supercritical or subcritical state to act. Such a resin may be a synthetic resin or a natural resin.

As the above resin, those having glass transition temperature Tg such that they soften at a temperature at which the fluid in a supercritical or subcritical state acts are preferred. As described later, $CO_2$ is preferably used as the fluid allowed to act in a supercritical or subcritical state. Therefore, as the resin, polystyrene, polypropylene, polymethyl methacrylate (PMMA), cellulose, and the like can be preferably used. In addition, the resin may be a copolymer of monomers constituting these polymers. However, as the resin material used in the present invention, various (meth) acrylic resins other than PMMA, various polyolefins other than polypropylene, and the like can also be used.

The shape of the above substrate comprising a resin is also not particularly limited. The substrate may be resin fine particles. In other words, the substrate may be a substrate in the form of fine particles. The diameter of the fine particle is not particularly limited, and fine particles 200 μm or less on average are preferably used, and a substrate comprising a resin in the form of particles larger than this may be used. When the substrate comprising a resin is in the form of particles, aggregation is less likely to occur in the composite material obtained according to the present invention, as described later. Therefore, it can be handled as a free flowing powder.

In addition, the substrate comprising a resin may be in the form of a sheet. In the case of a sheet-like substrate, a graphene-like carbon material layer can be formed on at least part of one surface and/or the opposite surface of the sheet-like substrate according to the present invention.

Further, the substrate comprising a resin used in the present invention need not necessarily be in the form of particles or a sheet. In other words, the shape of the substrate comprising a resin may have a complicated three-dimensional shape as long as it is possible to bring a graphene-like carbon material into contact with at least part of the surface of the substrate comprising a resin and, in the state, allow the fluid in a supercritical or subcritical state to act. Also in this case, a composite material having a complicated three-dimensional shape having a graphene-like carbon material layer on the surface can be obtained according to the present invention.

In addition, the graphene-like carbon material can also be selectively formed on part of a substrate having a complicated surface.

(Graphene-Like Carbon Material)

In the present invention, the above graphene-like carbon material layer is composed of a graphene-like carbon material. This graphene-like carbon material layer is obtained by pyrolyzing a polymer in a composition in which the polymer is fixed to graphite or primary exfoliated graphite. Therefore, it has a larger BET specific surface area than the original graphite or primary exfoliated graphite.

A composition in which a polymer is fixed to graphite or primary exfoliated graphite in the present invention refers to, for example, a composition in which a polymer is fixed to graphite or primary exfoliated graphite by grafting or adsorption. The fixation may be performed by other methods.

The above graphite is a stack of a plurality of graphene layers, and, for example, natural graphite, synthetic graphite, and expanded graphite can be used. Generally, in graphite, the number of stacked layers of graphene is about 100000 to 1000000, and the BET specific surface area is 20 $m^2/g$ or less. In addition, the above primary exfoliated graphite refers to exfoliated graphite used as a raw material in which the number of stacked layers of graphene is 1000 or less and the BET specific surface area is 500 $m^2/g$ or less herein.

The above polymer is not particularly limited, and radical decomposable polymers such as homopolymers of glycidyl methacrylate, polystyrene, polyvinyl acetate, polypropylene glycol, and polybutyral are preferably used. By using these polymers, the exfoliation of the graphite or primary exfoliated graphite described later can be performed much more effectively.

The graphene-like carbon material of the present invention is obtained by pyrolyzing the polymer in such a composition in which the polymer is fixed to graphite or primary exfoliated graphite. By the above pyrolysis, the graphite or primary exfoliated graphite is exfoliated, and the graphene-like carbon material layer of the present invention can be obtained.

Therefore, the number of stacked layers of graphene in this graphene-like carbon material layer is smaller than that in the original graphite or exfoliated graphite. More specifically, in the present invention, the number of stacked layers of graphene in the graphene-like carbon material constituting the above graphene-like carbon material layer is in the range of about 10 to 1000, and the BET specific surface area is in the range of 30 $m^2/g$ or more and 300 $m^2/g$ or less. The above graphene-like carbon material is not particularly limited and is preferably exfoliated graphite or graphene. The above graphene or exfoliated graphite has a large aspect ratio and has a small number of stacked layers of graphene, and therefore, the physical properties of the composite material can be increased much more by the addition of a small amount of the above graphene or exfoliated graphite.

The number of stacked layers of graphene in the stack of the above exfoliated graphite is about several to 200. In addition, the specific surface area of the exfoliated graphite is far larger than that of graphite and is 600 $m^2/g$ or more. In the present invention, the above exfoliated graphite refers to a graphene stack obtained by exfoliating graphite or primary exfoliated graphite and having the number of stacked layers of graphene as described above.

The graphene-like carbon material of the present invention may comprise a polymer. In this case, the pyrolysis initiation temperature and pyrolysis end temperature of the polymer contained in the graphene-like carbon material are higher than the pyrolysis initiation temperature and pyrolysis end temperature of the polymer before the fixation, respectively. When the graphene-like carbon material comprises a polymer, the electrical conductivity of the graphene-like carbon material is not high, and the electrical conductivity can be suppressed.

In addition, the graphene-like carbon material in the present invention may not comprise a polymer. In this case, the electrical conductivity of the graphene-like carbon material increases, and therefore, a composite material having high electrical conductivity can be provided.

The graphene-like carbon material of the present invention may or may not comprise a polymer in this manner, but preferably comprises a polymer because the adhesion to the substrate can be increased.

In the present invention, the thickness of the above graphene-like carbon material layer is not particularly limited and may be appropriately selected according to the use. However, when the graphene-like carbon material layer is provided on the surface of a substrate being resin a fine particle, the thickness of the graphene-like carbon material layer is about 0.5 nm to 500 nm. In addition, also when the graphene-like carbon material layer is provided on at least one surface of a sheet-like substrate, the thickness may be about 0.5 nm to 500 nm.

When the thickness of the graphene-like carbon material layer is too thick, the effect of resin physical properties may not be exhibited. On the contrary, when the thickness of the graphene-like carbon material layer is too thin, the physical property improvement effect of providing the graphene-like carbon material layer may not be sufficiently obtained.

In the present invention, part of the graphene-like carbon constituting the above graphene-like carbon material layer adheres to the surface of the substrate. Preferably, part of the graphene-like carbon enters inward from the surface of the substrate. Therefore, the adhesion between the graphene-like carbon material layer and the substrate comprising a resin is effectively increased by an anchor effect.

The composite material of the present invention in which the adhesion of graphene-like carbon to a substrate surface is excellent, more preferably the composite material of the present invention in which part of graphene-like carbon enters the interior of a substrate from the surface of the substrate, can be obtained according to the production method of the present invention.

(Production Method)

In the production method of the present invention, first, the above substrate comprising a resin, and the above graphene-like carbon material are provided. The above graphene carbon material can be prepared by pyrolyzing a polymer in a composition in which the above polymer is fixed to graphite or primary exfoliated graphite.

The above composition in which a polymer is fixed to graphite or primary exfoliated graphite is obtained, for example, by fixing the above polymer to the graphite or primary exfoliated graphite by grafting or adsorption.

The above grafting can be performed, for example, by polymerizing a radical polymerizable monomer in the presence of the graphite or primary exfoliated graphite. More specifically, by polymerizing the above radical polymerizable monomer, free radicals formed at the stage of forming the polymer are adsorbed on the ends and surfaces of the graphene layers of graphite or primary exfoliated graphite having radical trapping properties, and thus, the above grafting is performed.

The above radical polymerizable monomer is not particularly limited as long as it is a monomer having a functional group generally known as radical polymerizable. A monomer having an appropriate radical polymerizable functional group can be used. Examples of the above radical polymerizable monomer include styrene, methyl α-ethylacrylate, methyl α-benzylacrylate, methyl α-[2,2-bis(carbomethoxy)ethyl]acrylate, dibutyl itaconate, dimethyl itaconate, dicyclohexyl itaconate, α-methylene-δ-valerolactone, α-methylstyrene, α-substituted acrylates comprising α-acetoxystyrene, vinyl monomers having a glycidyl group or a hydroxyl group such as glycidyl methacrylate, 3,4-epoxycyclohexylmethyl methacrylate, hydroxyethyl methacrylate, hydroxyethyl acrylate, hydroxypropyl acrylate, and 4-hydroxybutyl methacrylate; vinyl monomers having an amino group such as allylamine, diethylaminoethyl(meth)acrylate, and dimethylaminoethyl(meth)acrylate; monomers having a carboxyl group such as methacrylic acid, maleic anhydride, maleic acid, itaconic acid, acrylic acid, crotonic acid, 2-acryloyloxyethyl succinate, 2-methacryloyloxyethyl succinate, and 2-methacryloyloxyethylphthalic acid; monomers having a phosphate group such as Phosmer M, Phosmer CL, Phosmer PE, Phosmer MH, and Phosmer PP manufactured by Uni-Chemical Co., Ltd.; monomers having an alkoxysilyl group such as vinyltrimethoxysilane and 3-methacryloxypropyltrimethoxysilane; and (meth)acrylate-based monomers having an alkyl group, a benzyl group, or the like. The above radical polymerizable monomer may be used alone, or a plurality of types of monomers may be used in combination. Preferably, as the above radical polymerizable monomer, an inexpensive styrene monomer can be used.

The method for fixing the polymer to the graphite or exfoliated graphite by adsorption is not particularly limited. Examples of the method include a method of mixing the graphite or primary exfoliated graphite and the polymer in a solvent and further carrying out ultrasonic treatment.

In addition, the pyrolysis of the polymer in the composition in which the above polymer is fixed to graphite or primary exfoliated graphite in the present invention is performed by heating the composition to the pyrolysis temperature of the above polymer. In the present invention, the pyrolysis temperature of the above polymer refers to TGA measurement-dependent decomposition end point temperature. For example, when the polymer is polystyrene, the pyrolysis temperature of the above polymer is about 350° C.

When the above polymer fixed to the ends and surfaces of the graphene layers of the above graphite or primary exfoliated graphite, and the like are pyrolyzed, exfoliation force occurs between the above graphene layers. Therefore, by pyrolyzing the above polymer and the like, the above graphite or primary exfoliated graphite can be exfoliated between the graphene layers of the above graphite or primary exfoliated graphite to obtain exfoliated graphite.

In addition, part of the polymer is left in the composition even by this pyrolysis. The pyrolysis initiation temperature and pyrolysis end temperature of the resin in the exfoliated graphite-resin composite material obtained by the pyrolysis are higher than the pyrolysis initiation temperature and pyrolysis end temperature of the resin before the compounding, respectively.

The above heating method is not particularly limited as long as it is a method that can heat the above composition to the pyrolysis temperature of the above polymer. The above composition can be heated by an appropriate method and apparatus. In addition, in the above heating, heating may be performed without sealing, that is, under normal pressure. Therefore, exfoliated graphite can be produced inexpensively and easily. Pyrolysis such that the polymer is left can be achieved by adjusting the heating time. In other words, by shortening the heating time, the amount of the resin left can be increased. In addition, by lowering the heating temperature, the amount of the polymer resin can also be increased.

On the other hand, the above polymer may be reliably pyrolyzed, and burned off and removed. Therefore, in order to burn off and remove the above polymer, after the above composition is heated to a temperature equal to or higher than the pyrolysis temperature of the above polymer, the above temperature may be further maintained for a certain time. The time that the above composition is maintained around the above temperature is preferably in the range of 0.5 to 5 hours though depending on the type and amount of the radical polymerizable monomer used.

In the above pyrolysis, a pyrolyzable foaming agent may be further used. The above pyrolyzable foaming agent is not particularly limited as long as it is a compound that decomposes spontaneously by heating and generates a gas during the decomposition. As the above pyrolyzable foaming agent, for example, azocarboxylic acid-based, diazoacetamide-based, azonitrile compound-based, benzenesulfohydrazine-based, or nitroso compound-based foaming agents or the like that generate a nitrogen gas during decomposition, or foaming agents that generate carbon monoxide, carbon dioxide, methane, aldehyde, or the like during decomposition can be used. The above pyrolyzable foaming agent may be used alone, or a plurality of types of foaming agents may be used in combination. Preferably, as the above pyrolyzable foaming agent, azodicarbonamide (ADCA) can be used.

In the above heating, in a case where the above composition further comprises a pyrolyzable foaming agent, when the above composition is heated to the pyrolysis temperature of the above pyrolyzable foaming agent, the above pyrolyzable foaming agent is pyrolyzed in the above composition. On the other hand, the above pyrolyzable foaming agent generates a gas and foams during pyrolysis. At this time, when the above pyrolyzable foaming agent is pyrolyzed in the vicinity of the graphene layers of the above graphite or primary exfoliated graphite, the above gas generated by the above pyrolysis enters between the above graphene layers, and the space between the above graphene layers is increased. Thus, exfoliation force occurs between the above graphene layers, and therefore, the above graphite or primary exfoliated graphite can be further exfoliated. Therefore, by using the above pyrolyzable foaming agent, the specific surface area of the obtained exfoliated graphite can be increased much more.

In the production method of the present invention, next, the above substrate comprising a resin, and the above graphene-like carbon material are provided. Next, the above graphene-like carbon material is brought into contact with at least part of the surface of the substrate comprising a resin, and in the state, heating is performed while a fluid in a supercritical or subcritical state is allowed to act. As the fluid in a supercritical or subcritical state, $CO_2$, $H_2O$, and the like can be used.

$CO_2$ is in a supercritical state at a temperature of 31.1° C. and an air pressure of about 7.52 Mpa. In addition, $CO_2$ is in a subcritical state in the range of −56.6° C. to 31.1° C. and air pressures of about 0.528 Mpa to 7.52 MPa. By performing heating while allowing the fluid in a supercritical or subcritical state to act, the surface of the substrate comprising a resin softens. Therefore, the graphene-like carbon comes into contact with the softened substrate surface. In addition, preferably, part of the graphene-like carbon enters the substrate surface. Therefore, when cooling is performed after the heating, a graphene-like carbon material layer is formed so as to cover at least part of the substrate surface so that the graphene-like carbon adheres to the substrate surface. In other words, the composite material of the present invention can be obtained.

Therefore, the glass transition temperature Tg of the resin constituting the above substrate comprising a resin is desirably in the temperature atmosphere in the above step of performing heating while allowing the fluid in a supercritical or subcritical state to act. More specifically, the glass transition temperature Tg of the resin is desirably in the range of the above heating temperature −100° C. to +100° C. When the glass transition temperature Tg of the resin is in this range, part of the graphene-like carbon can be reliably allowed to enter the surface of the substrate comprising a resin.

When the graphene-like carbon material is brought into contact with the surface of the above substrate comprising a resin, the graphene-like carbon material may be brought into contact with at least part of the surface of the substrate as described above. However, the graphene-like carbon material may be brought into contact with the entire surface of the substrate.

Further, as described above, heating is performed while the fluid in a supercritical or subcritical state is allowed to act in a state in which the graphene-like carbon material is brought into contact with at least part of the substrate surface, and therefore, it is possible to selectively bring the graphene-like carbon material into contact with part of the substrate surface to also easily obtain a composite material in which a graphene-like carbon material layer is selectively provided on part of the substrate surface. In addition, also when a substrate having a complicated three-dimensional shape is used as described above, the graphene-like carbon material layer can be formed on its surface easily and reliably according to the present invention.

(Physical Properties of Composite Material)

In the composite material according to the present invention, the adhesion of the graphene-like carbon material to the substrate surface is increased, and preferably, the graphene-like carbon material layer is formed so that part of the graphene-like carbon material enters the surface of the substrate comprising a resin, as described above. Therefore, the adhesion between the graphene-like carbon material layer and the substrate can be effectively increased. Therefore, even if the composite material is exposed to an environment with a thermal history, the peeling of the graphene-like carbon material layer from the substrate, and the like are less likely to occur. In addition, the adhesion is excellent, and therefore, the improvement of mechanical strength by the carbon material, and the like can also be effectively promoted.

In addition, according to an experiment by the inventors in this application, for example, it has been found that in a composite material obtained by forming the above graphene-like carbon material layer on PMMA according to the present invention, the glass transition temperature Tg of the composite material is also increased. Therefore, a composite material having excellent heat resistance can be provided. It is considered that the Tg of the composite material is increased in this manner because the adhesion between the graphene-like carbon material and the surface of the PMMA is increased, and therefore, the interaction between the graphene-like carbon and the resin increases.

When not only PMMA but also other resins are used, the Tg of the composite material can be effectively increased compared with the Tg of the original resin by forming the graphene-like carbon material layer according to the present invention. Therefore, a composite material having excellent heat resistance can be provided.

The present invention will be described in more detail below based on specific Examples. The present invention is not limited to the following Examples in any way and can be carried out by making appropriate changes without departing from the spirit thereof.

[Preparation of Exfoliated Graphite]

Experimental Example 1

10 g of expanded graphite (manufactured by TOYO TANSO CO., LTD., trade name "PF Powder 8," BET specific surface area=22 m$^2$/g), 200 g of polypropylene glycol (PPG, manufactured by Sanyo Chemical Industries, Ltd., product number: SANNIX GP-3000, number average molecular weight=3000), 20 g of ADCA having the structure represented by the above formula (1) (manufactured by EIWA CHEMICAL IND. CO., LTD, trade name "AC#R-3K," pyrolysis temperature 210° C.) as a pyrolyzable foaming agent, and 200 g of tetrahydrofuran as a solvent were mixed to prepare a raw material composition. Next, the raw material composition was irradiated with ultrasonic waves at 100 W and an oscillation frequency of 28 kHz for 2 hours using an ultrasonic treatment apparatus (manufactured by Honda Electronics Co., Ltd.). The polypropylene glycol was adsorbed on the expanded graphite by this ultrasonic treatment. In this manner, a composition in which the polypropylene glycol was adsorbed on the expanded graphite was prepared.

After the above ultrasonic irradiation, the above composition was molded by a solution casting method, maintained at a drying temperature of 80° C. for 2 hours, then maintained at a temperature of 110° C. for 1 hour, further maintained at a temperature of 150° C. for 1 hour, and further maintained at a temperature of 230° C. for 2 hours. Thus, the above ADCA was pyrolyzed and foamed in the above composition. Next, the heating step of maintaining the above composition at a temperature of 400° C. for 24 hours was carried out. Thus, the above polypropylene glycol was pyrolyzed to obtain exfoliated graphite.

Figure 23:
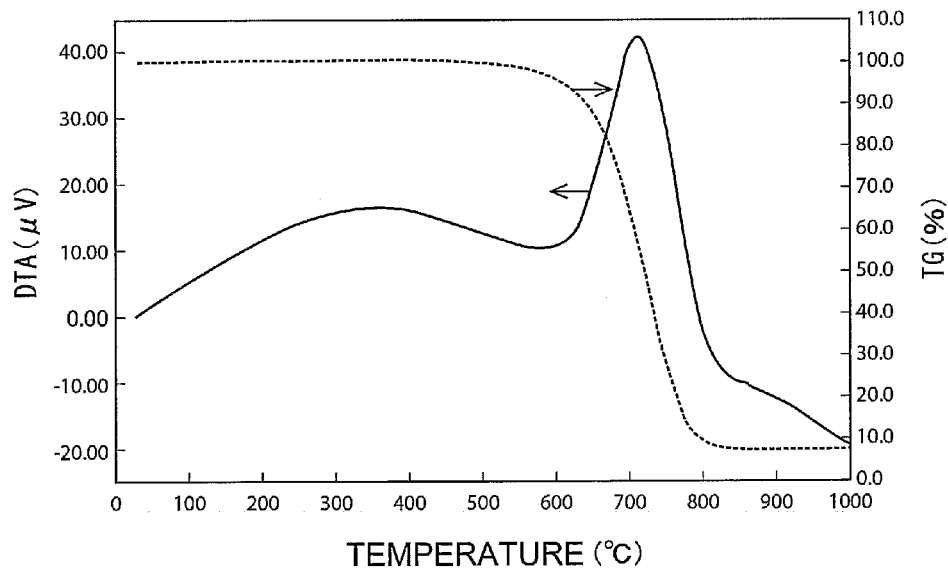
FIG. 23 is a diagram showing the TG/DTA measurement results of exfoliated graphite obtained in Experimental Example 1.

FIG. 23 is a diagram showing the TG/DTA measurement results of the obtained exfoliated graphite.

As is clear from FIG. 23, it is found that the polypropylene glycol, which is a polymer, is left after the pyrolysis.

Experimental Example 2

10 g of expanded graphite (manufactured by TOYO TANSO CO., LTD., trade name "PF Powder 8"), 200 mg of ADCA having the structure represented by the above formula (1) (manufactured by EIWA CHEMICAL IND. CO., LTD, trade name "AC#R-3K," pyrolysis temperature 210° C.) as a pyrolyzable foaming agent, and 200 g of a styrene monomer (manufactured by Wako Pure Chemical Industries, Ltd.) as a radical polymerizable monomer were mixed to provide a mixture. Next, the above mixture was ultrasonically treated at 100 W and an oscillation frequency of 28 kHz for 120 minutes using an ultrasonic treatment apparatus (manufactured by Honda Electronics Co., Ltd.). Thus, a composition in which the above expanded graphite was dispersed in the above styrene monomer was obtained.

Next, the above composition was heated to a temperature of 120° C., maintained for 1 hour, and further maintained at a temperature of 150° C. for 1 hour. Thus, the styrene monomer in the above composition was polymerized.

Next, the above composition was further heated to a temperature of 230° C. and maintained at the temperature of 230° C. for 1 hour. Thus, the above ADCA was pyrolyzed and foamed in the above composition.

Then, the above composition was further heated to a temperature of 430° C. and maintained at the temperature of 430° C. for 2 hours. Thus, the polymer in which the styrene monomer was polymerized in the above composition was pyrolyzed to obtain exfoliated graphite.

Figure 24:
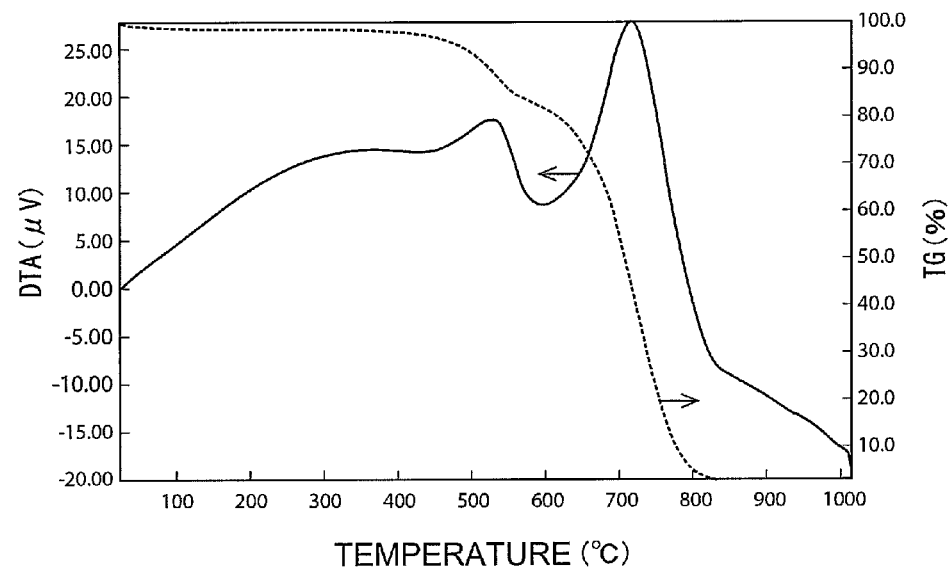
FIG. 24 is a diagram showing the TG/DTA measurement results of exfoliated graphite obtained in Experimental Example 2.

FIG. 24 is a diagram showing the TG/DTA measurement results of the obtained exfoliated graphite.

As is clear from FIG. 24, it is found that polystyrene, which is a polymer, disappears after the pyrolysis.

Experimental Example 3

2 g of expanded graphite (manufactured by TOYO TANSO CO., LTD., trade name "PF Powder 8," BET specific surface area=22 m²/g), 4 g of ADCA having the structure represented by the above formula (1) (manufactured by EIWA CHEMICAL IND. CO., LTD, trade name "AC#R-3K," pyrolysis temperature 210° C.) as a pyrolyzable foaming agent, 40 g of polypropylene glycol PPG, manufactured by Sanyo Chemical Industries, Ltd., product number: SANNIX GP-3000, number average molecular weight=3000), and 40 g of tetrahydrofuran as a solvent were mixed to prepare a raw material composition. Next, the raw material composition was irradiated with ultrasonic waves at 100 W and an oscillation frequency of 28 kHz for 2 hours using an ultrasonic treatment apparatus (manufactured by Honda Electronics Co., Ltd.). The polypropylene glycol was adsorbed on the expanded graphite by this ultrasonic treatment. In this manner, a composition in which the polypropylene glycol was adsorbed on the expanded graphite was prepared.

After the above ultrasonic irradiation, the above composition was molded by a solution casting method, maintained at a drying temperature of 80° C. for 2 hours, then maintained at a temperature of 110° C. for 1 hour, further maintained at a temperature of 150° C. for 1 hour, and further maintained at a temperature of 230° C. for 2 hours. Thus, the above ADCA was pyrolyzed and foamed in the above composition.

Next, the heating step of maintaining the above composition at a temperature of 450° C. for 3 hours was carried out. Thus, the above polypropylene glycol was pyrolyzed to obtain exfoliated graphite.

Figure 25:
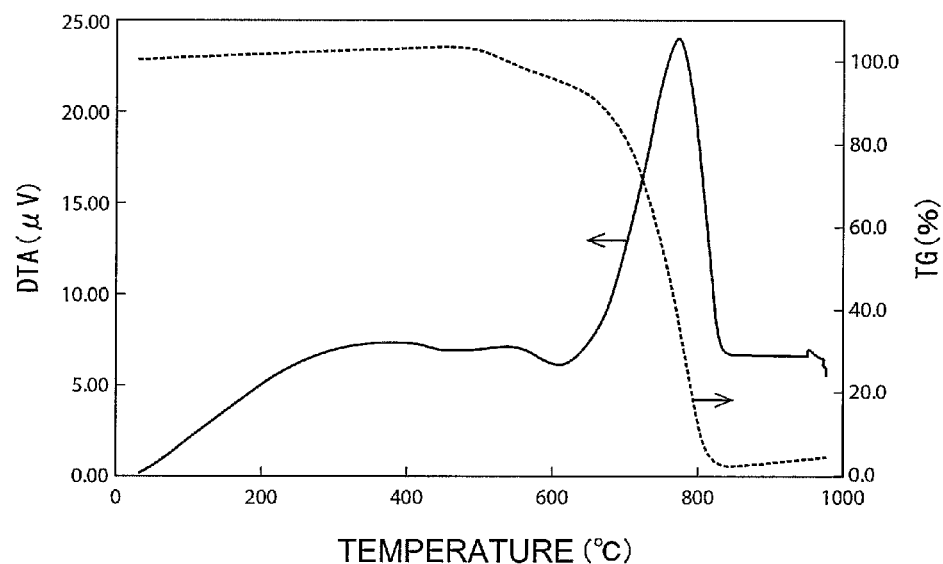
FIG. 25 is a diagram showing the TG/DTA measurement results of exfoliated graphite obtained in Experimental Example 3.

FIG. 25 is a diagram showing the TG/DTA measurement results of the obtained exfoliated graphite.

As is clear from FIG. 25, it is found that the polypropylene glycol, which is a polymer, is left after the pyrolysis.

Experimental Example 4

3 g of expanded graphite (manufactured by TOYO TANSO CO., LTD., trade name "PF Powder 8," BET specific surface area=22 m²/g), 6 g of ADCA having the structure represented by the above formula (1) (manufactured by EIWA CHEMICAL IND. CO., LTD, trade name "AC#R-3K," pyrolysis temperature 210° C.) as a pyrolyzable foaming agent, 60 g of a vinyl acetate polymer (SN-04T, manufactured by DENKA) as a radical polymerizable monomer, and 120 g of tetrahydrofuran were mixed to provide a mixture. Next, the above mixture was ultrasonically treated at 100 W and an oscillation frequency of 28 kHz for 120 minutes using an ultrasonic treatment apparatus (manufactured by Honda Electronics Co., Ltd.). Thus, a composition in which the above expanded graphite was dispersed in the above vinyl acetate polymer was obtained.

Next, the above composition was subjected to drying treatment at 80° C. for 2 hours and further heated to a temperature of 110° C. to completely dry the THF solution. The above composition was further maintained at a temperature of 230° C. for 2 hours. Thus, the above ADCA was pyrolyzed and foamed in the above composition.

Then, the above composition was further heated to a temperature of 450° C. and maintained for 2 hours. Thus, the vinyl acetate polymer in the above composition was pyrolyzed to obtain exfoliated graphite.

Figure 26:
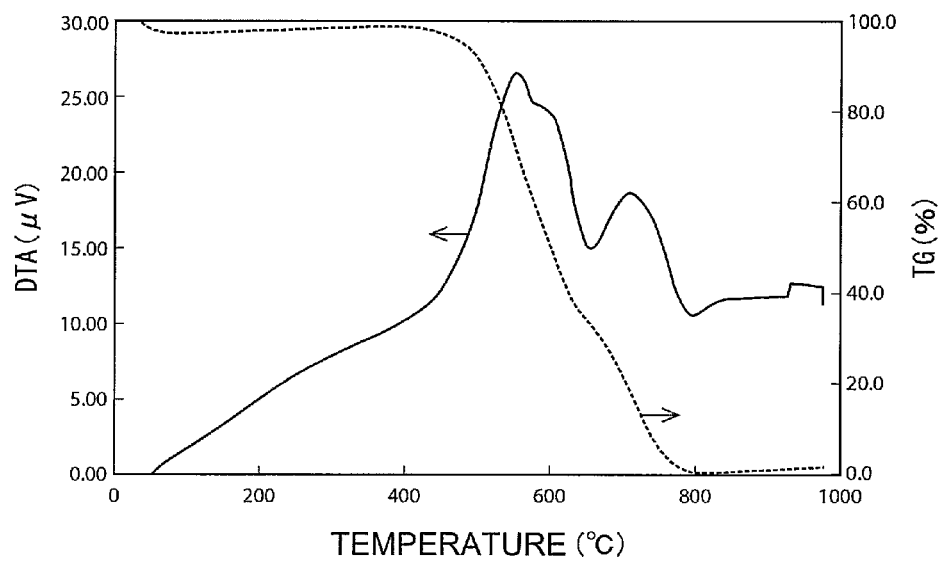
FIG. 26 is a diagram showing the TG/DTA measurement results of exfoliated graphite obtained in Experimental Example 4.

FIG. 26 is a diagram showing the TG/DTA measurement results of the obtained exfoliated graphite.

As is clear from FIG. 26, it is found that polyvinyl acetate, which is a polymer, is left after the pyrolysis.

[Production of Composite Materials]

Example 1

As a substrate comprising a resin, fine particles comprising mainly polystyrene (manufactured by Sekisui Plastics Co., Ltd., product number: S-20, average particle diameter: 300 μm, Tg: 106° C.) were provided. 1.0 g of these fine particles comprising mainly polystyrene and 0.001 g of the exfoliated graphite obtained in Experimental Example 1 were placed in a pressure container, and 10 mL of $CO_2$ brought into a supercritical state at room temperature (23° C.) and a pressure of 10 MPa was added, and then, the $CO_2$ was once removed (in order to remove moisture for drying). Then, 10 mL of $CO_2$ brought into a supercritical state at room temperature (23° C.) and a pressure of 10 MPa was added again. Then, the temperature was raised to 50° C., and the mixture was heated with stirring for 6 hours. The pressure at this time rose to about 27.6 MPa. Thereafter, cooling to room temperature was performed to obtain a composite material. The average particle diameter of the obtained composite material in the form of particles was 300 μm. In addition, the surfaces of the particles as the composite material obtained in this manner were observed by a scanning electron microscope (JCM-5700 manufactured by JEOL Ltd.).

Figure 2:
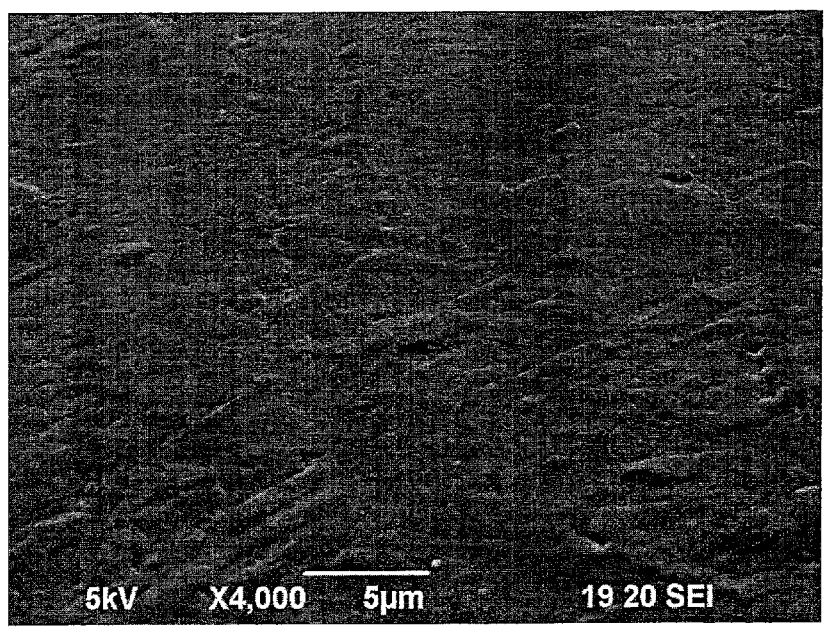
FIG. 2 is a scanning electron micrograph (4000×) of a fine particle after 1 g of polystyrene fine particles (product number S-20 manufactured by Sekisui Plastics Co., Ltd.) and 0.001 g of exfoliated graphite obtained in Experimental Example 1 are mixed, and supercritical carbon dioxide (50° C., 27.6 MPa) is allowed to act for 6 hours.

FIG. 1 shows a 200× electron micrograph of the particle as the composite material obtained in Example 1, and FIG. 2 is an electron micrograph showing its surface magnified 4000 times.

Figure 3:
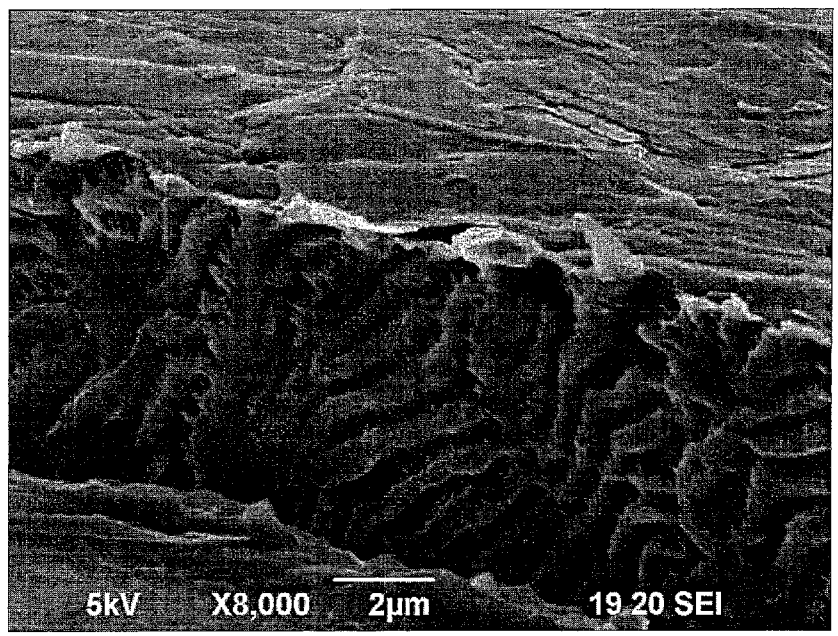
FIG. 3 is a scanning electron micrograph (8000×) of a fine particle partially cut using a mortar after 1 g of polystyrene fine particles (product number S-20 manufactured by Sekisui Plastics Co., Ltd.) and 0.001 g of exfoliated graphite obtained in Experimental Example 1 are mixed, and supercritical carbon dioxide (50° C., 27.6 MPa) is allowed to act for 6 hours.

The above particles were partially cut using a mortar, and the partially cut particles were also observed by the scanning electron microscope (JCM-5700 manufactured by JEOL Ltd.). FIG. 3 shows a scanning electron micrograph at 8000× magnification obtained in this manner. As is clear from FIG. 1 to FIG. 3, in the obtained composite material, a graphene-like carbon material is formed on the fine particle surface, and particularly from the photograph in FIG. 3, it is found that the graphene-like carbon accumulates on the substrate particle surface.

Example 2

A composite material was obtained as in Example 1 except that 0.001 g of the exfoliated graphite obtained in Experimental Example 1 and 1.0 g of fine particles comprising mainly a copolymer of polystyrene and 2-hydroxyethyl methacrylate (manufactured by Sekisui Plastics Co., Ltd., product number: CS-10, average particle diameter: 100 μm, Tg: 98° C.) were mixed, and the temperature was raised to 45° C., and the mixture was stirred for 5 hours. The pressure during the mixing rose to about 27.6 MPa. The surfaces of particles as the obtained composite material were observed by a scanning electron microscope (JCM-5700 manufactured by JEOL Ltd.).

Figure 4:
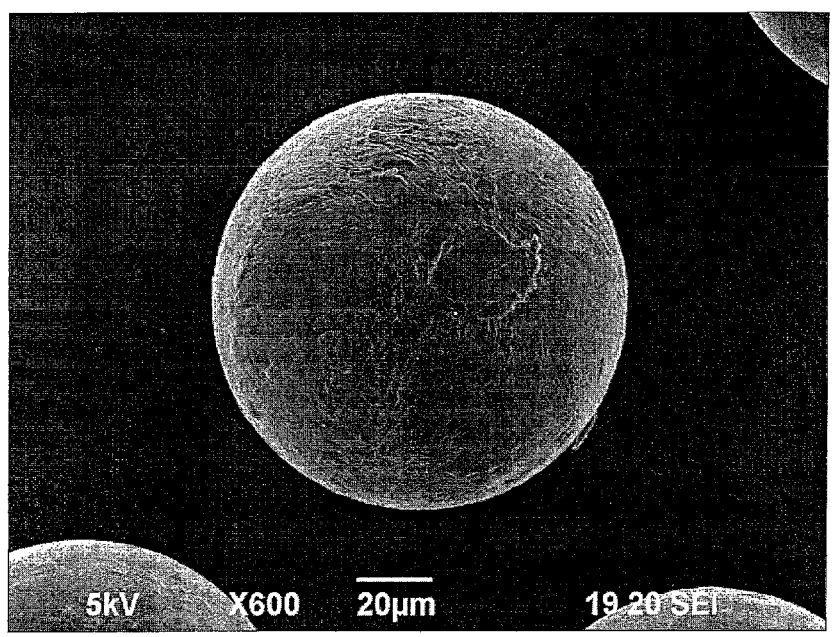
FIG. 4 is a scanning electron micrograph (600×) of a fine particle after 1 g of fine particles comprising mainly a copolymer of polystyrene and 2-hydroxyethyl methacrylate (product number CS-10 manufactured by Sekisui Plastics Co., Ltd.) and 0.001 g of exfoliated graphite obtained in Experimental Example 1 are mixed, and supercritical carbon dioxide (45° C., 27.6 MPa) is allowed to act for 5 hours.
Figure 5:
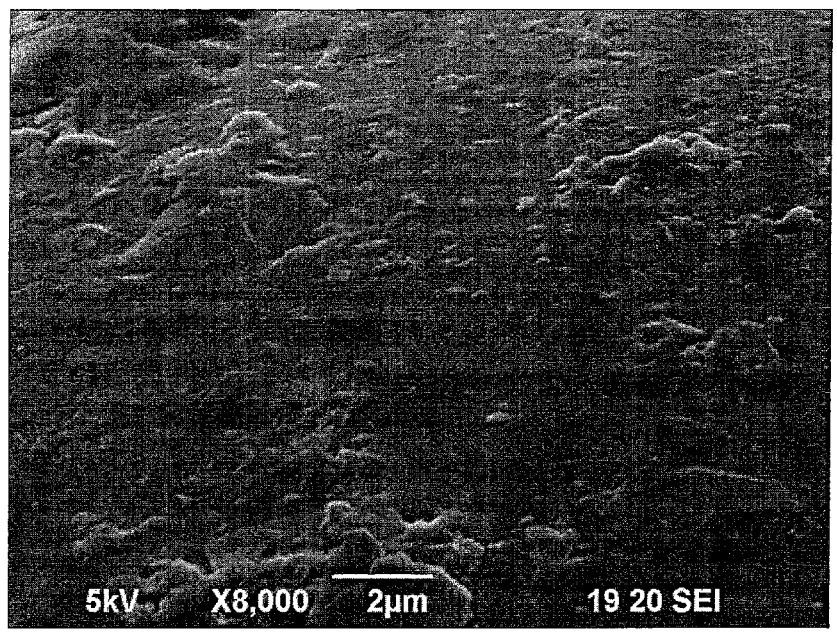
FIG. 5 is a scanning electron micrograph (8000×) of a fine particle after 1 g of fine particles comprising mainly a copolymer of polystyrene and 2-hydroxyethyl methacrylate (product number CS-10 manufactured by Sekisui Plastics Co., Ltd.) and 0.001 g of exfoliated graphite obtained in Experimental Example 1 are mixed, and supercritical carbon dioxide (45° C., 27.6 MPa) is allowed to act for 5 hours.
Figure 6:
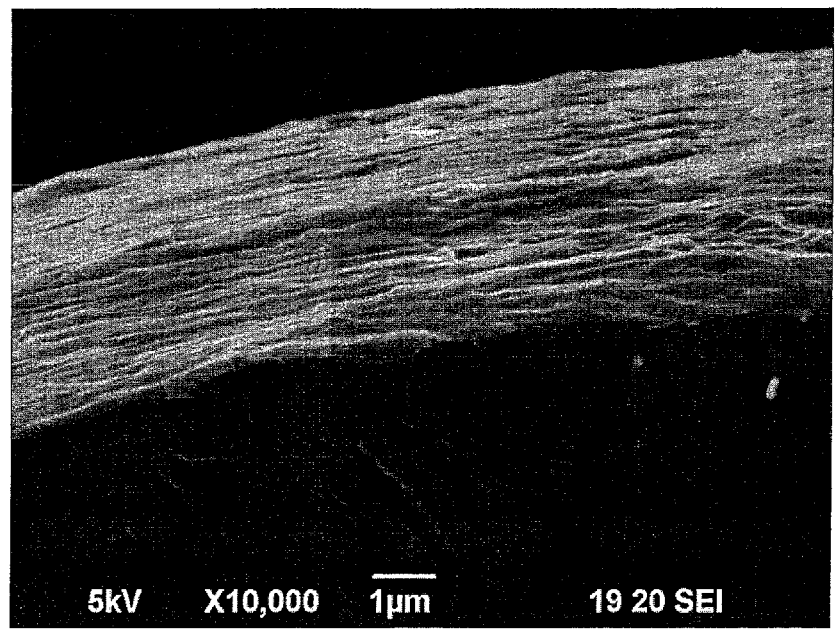
FIG. 6 is a scanning electron micrograph (10000×) of a fine particle partially cut using a mortar after 1 g of fine particles comprising mainly a copolymer of polystyrene and 2-hydroxyethyl methacrylate (product number CS-10 manufactured by Sekisui Plastics Co., Ltd.) and 0.001 g of exfoliated graphite obtained in Experimental Example 1 are mixed, and supercritical carbon dioxide (45° C., 27.6 MPa) is allowed to act for 5 hours.

FIG. 4 and FIG. 5 are respectively 600× and 8000× scanning electron micrographs of the particle as the composite material obtained in Example 2. The above particles were partially cut using a mortar, and the partially cut particles were also observed by the scanning electron microscope (JCM-5700 manufactured by JEOL Ltd.). FIG. 6 shows a scanning electron micrograph at 10000× magnification obtained in this manner. From the photographs in FIGS. 4 to 6, it is found that part of graphene-like carbon enters inside the surface of the original substrate particle comprising mainly a resin.

Example 3

A composite material was obtained as in Example 1 except that 1.0 g of a substrate comprising a resin similar to that of Example 1 and 0.001 g of the exfoliated graphite obtained in Experimental Example 2 were mixed, and the temperature was raised to 55° C., and the mixture was stirred for 12 hours. The pressure during the mixing rose to about 27.6 MPa. The surfaces of particles as the obtained composite material were observed by a scanning electron microscope (JCM-5700 manufactured by JEOL Ltd.).

Figure 7:
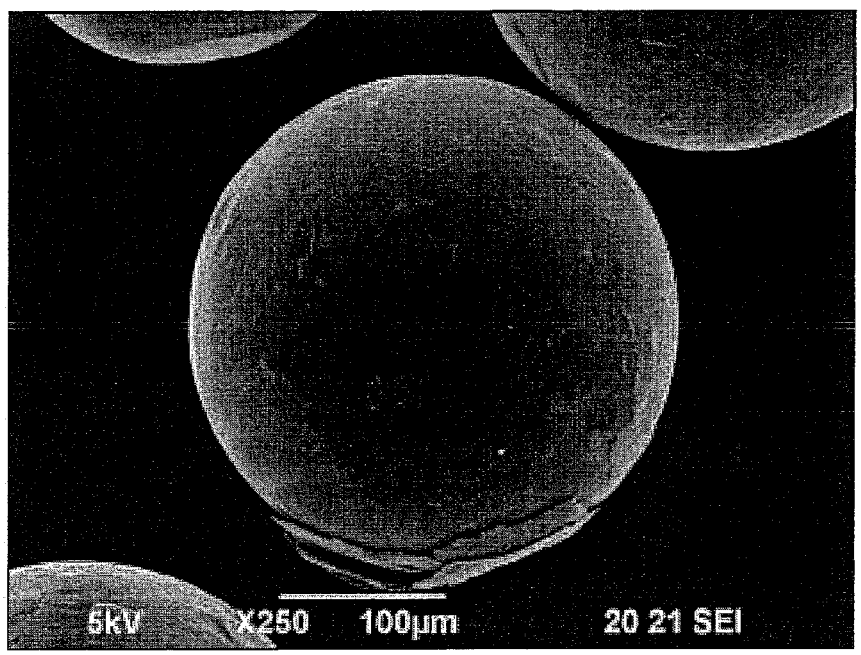
FIG. 7 is a scanning electron micrograph (250×) of a fine particle after 1 g of polystyrene fine particles (product number S-20 manufactured by Sekisui Plastics Co., Ltd.) and 0.001 g of exfoliated graphite obtained in Experimental Example 2 are mixed, and supercritical carbon dioxide (55° C., 27.6 MPa) is allowed to act for 12 hours.
Figure 8:
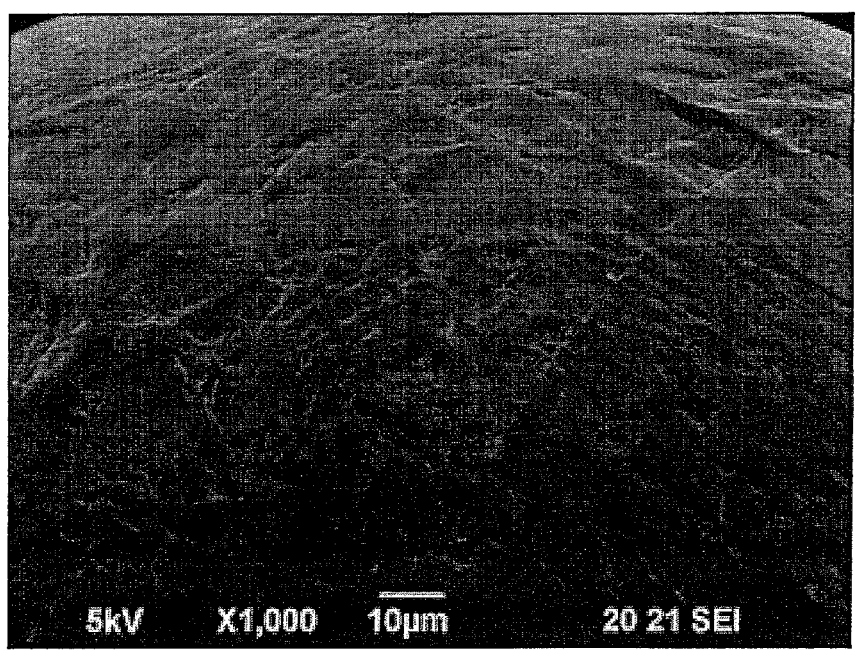
FIG. 8 is a scanning electron micrograph (1000×) of a fine particle after 1 g of polystyrene fine particles (product number S-20 manufactured by Sekisui Plastics Co., Ltd.) and 0.001 g of exfoliated graphite obtained in Experimental Example 2 are mixed, and supercritical carbon dioxide (55° C., 27.6 MPa) is allowed to act for 12 hours.
Figure 9:
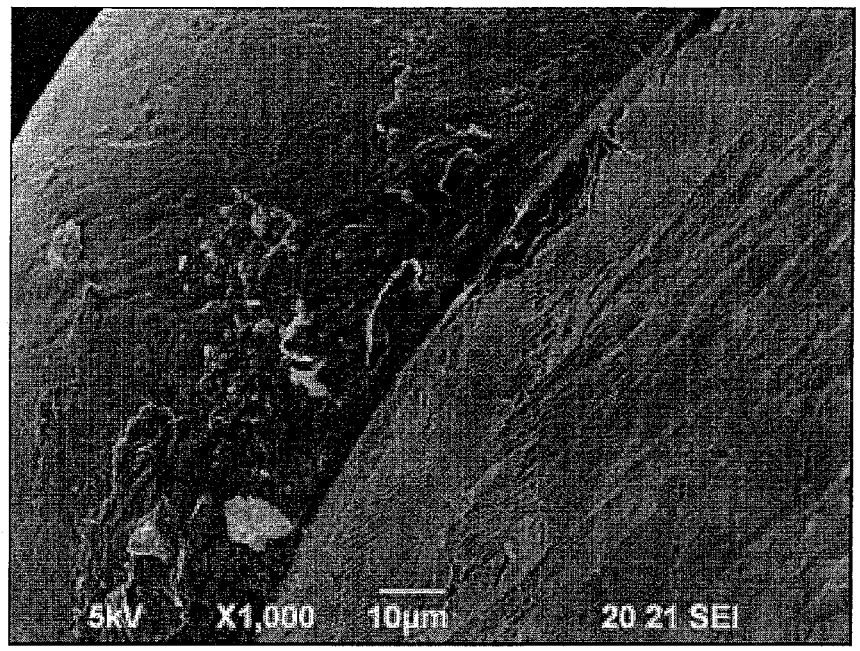
FIG. 9 is a scanning electron micrograph (1000×) of a fine particle partially cut using a mortar after 1 g of polystyrene fine particles (product number S-20 manufactured by Sekisui Plastics Co., Ltd.) and 0.001 g of exfoliated graphite obtained in Experimental Example 2 are mixed, and supercritical carbon dioxide (55° C., 27.6 MPa) is allowed to act for 12 hours.

FIG. 7 and FIG. 8 are respectively 250× and 1000× scanning electron micrographs of the particle as the composite material obtained in Example 3. The above particles were partially cut using a mortar, and the partially cut particles were also observed by the scanning electron microscope (JCM-5700 manufactured by JEOL Ltd.). FIG. 9 shows a scanning electron micrograph at 1000× magnification obtained in this manner. From the photographs in FIGS. 7 to 9, it is found that part of graphene-like carbon enters inside the surface of the original substrate particle comprising mainly a resin.

Example 4

A composite material was obtained as in Example 2 except that 1.0 g of a substrate comprising a resin similar to that of Example 2 and 0.002 g of the exfoliated graphite obtained in Experimental Example 2 were mixed, and the temperature was raised to 55° C., and the mixture was stirred for 4 hours. The pressure during the mixing rose to about 27.6 MPa. The surfaces of particles as the obtained composite material were observed by a scanning electron microscope (JCM-5700 manufactured by JEOL Ltd.).

Figure 10:
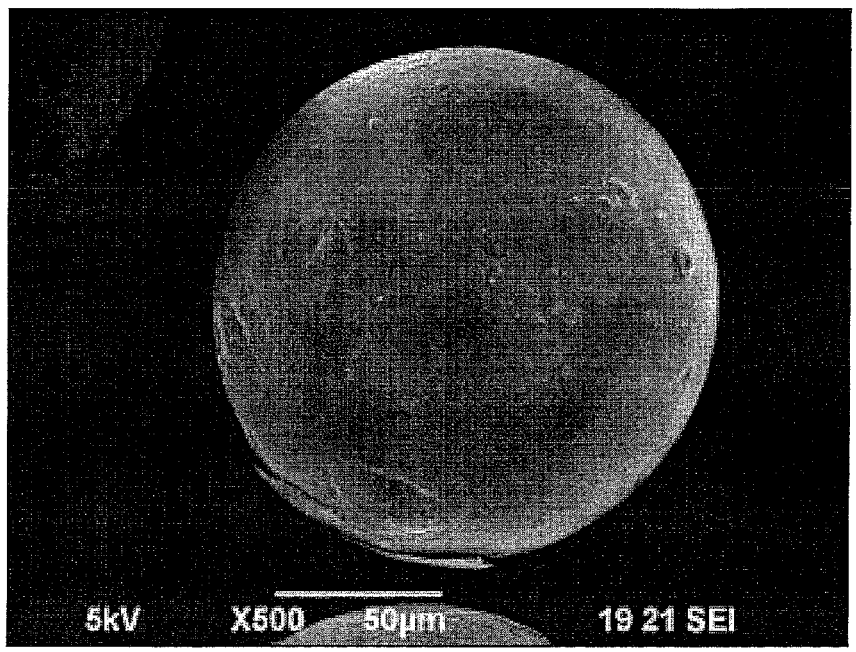
FIG. 10 is a scanning electron micrograph (500×) of a fine particle after 1 g of fine particles comprising mainly a copolymer of polystyrene and 2-hydroxyethyl methacrylate (product number CS-10 manufactured by Sekisui Plastics Co., Ltd.) and 0.002 g of exfoliated graphite obtained in Experimental Example 2 are mixed, and supercritical carbon dioxide (55° C., 27.6 MPa) is allowed to act for 4 hours.
Figure 11:
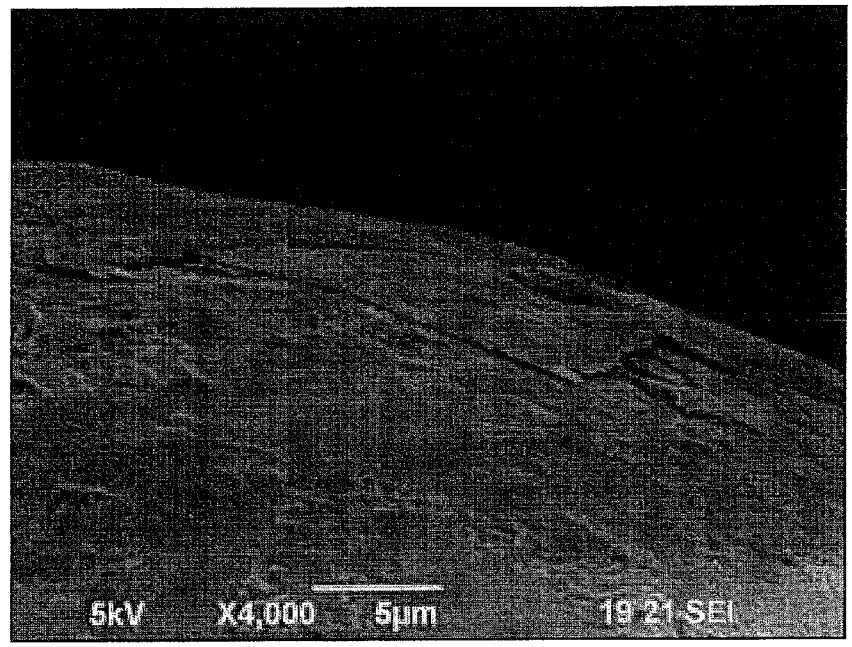
FIG. 11 is a scanning electron micrograph (4000×) of a fine particle after 1 g of fine particles comprising mainly a copolymer of polystyrene and 2-hydroxyethyl methacrylate (product number CS-10 manufactured by Sekisui Plastics Co., Ltd.) and 0.002 g of exfoliated graphite obtained in Experimental Example 2 are mixed, and supercritical carbon dioxide (55° C., 27.6 MPa) is allowed to act for 4 hours.

FIG. 10 and FIG. 11 are respectively 500× and 4000× scanning electron micrographs of the particle as the composite material obtained in Example 4. From the photographs in FIGS. 10 to 11, it is found that part of graphene-like carbon enters inside the surface of the original substrate particle comprising mainly a resin.

Example 5

A composite material was obtained as in Example 1 except that 1.0 g of a substrate comprising a resin similar to that of Example 1 and 0.001 g of the exfoliated graphite obtained in Experimental Example 3 were mixed, and the temperature was raised to 55° C., and the mixture was stirred for 12 hours. The pressure during the mixing rose to about 27.6 MPa. The surfaces of particles as the obtained composite material were observed by a scanning electron microscope (JCM-5700 manufactured by JEOL Ltd.).

Figure 12:
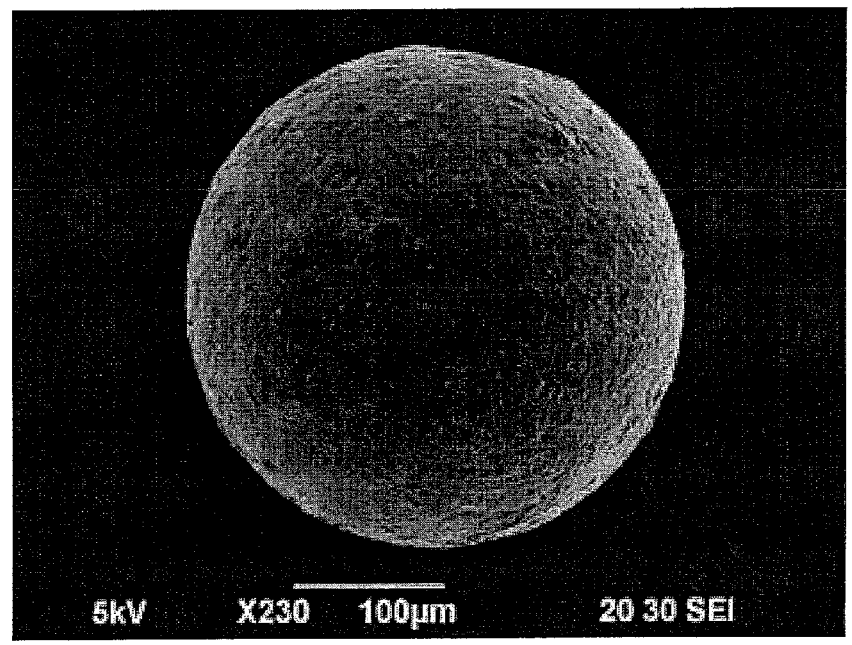
FIG. 12 is a scanning electron micrograph (230×) of a fine particle after 1 g of polystyrene fine particles (product number S-20 manufactured by Sekisui Plastics Co., Ltd.) and 0.001 g of exfoliated graphite obtained in Experimental Example 3 are mixed, and supercritical carbon dioxide (55° C., 27.6 MPa) is allowed to act for 12 hours.
Figure 13:
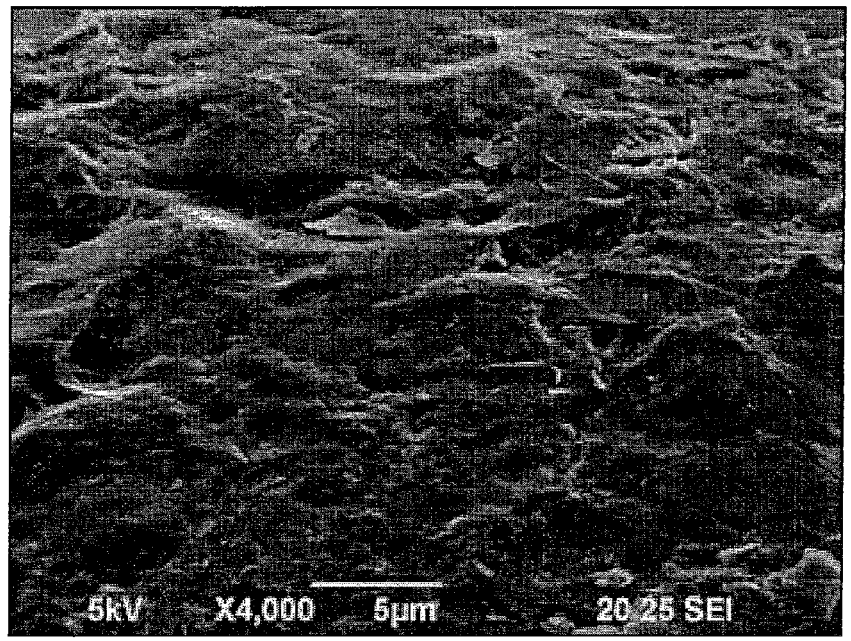
FIG. 13 is a scanning electron micrograph (4000×) of a fine particle after 1 g of polystyrene fine particles (product number S-20 manufactured by Sekisui Plastics Co., Ltd.) and 0.001 g of exfoliated graphite obtained in Experimental Example 3 are mixed, and supercritical carbon dioxide (55° C., 27.6 MPa) is allowed to act for 12 hours.
Figure 14:
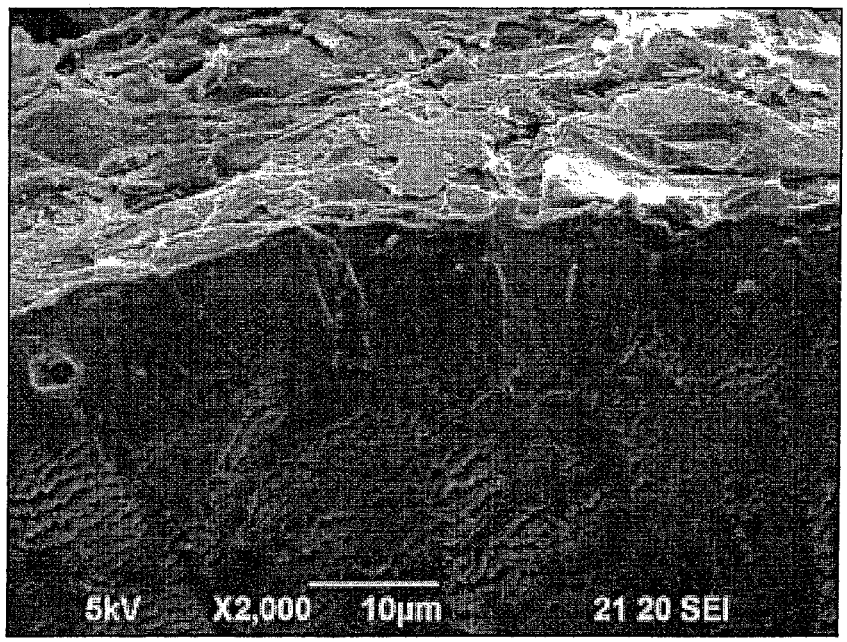
FIG. 14 is a scanning electron micrograph (2000×) of a fine particle partially cut using a mortar after 1 g of polystyrene fine particles (product number S-20 manufactured by Sekisui Plastics Co., Ltd.) and 0.001 g of exfoliated graphite obtained in Experimental Example 3 are mixed, and supercritical carbon dioxide (55° C., 27.6 MPa) is allowed to act for 12 hours.

FIG. 12 and FIG. 13 are respectively 230× and 4000× scanning electron micrographs of the particle as the composite material obtained in Example 5. The above particles were partially cut using a mortar, and the partially cut particles were also observed by the scanning electron microscope (JCM-5700 manufactured by JEOL Ltd.). FIG. 14 shows a scanning electron micrograph at 2000× magnification obtained in this manner. From the photographs in FIGS. 12 to 14, it is found that part of graphene-like carbon enters inside the surface of the original substrate particle comprising a resin.

Example 6

A composite material was obtained as in Example 2 except that 1.0 g of a substrate comprising a resin similar to that of Example 2 and 0.002 g of the exfoliated graphite obtained in Experimental Example 3 were mixed, and the temperature was raised to 55° C., and the mixture was stirred for 4 hours. The pressure during the mixing rose to about 27.6 MPa. The surfaces of particles as the obtained composite material were observed by a scanning electron microscope (JCM-5700 manufactured by JEOL Ltd.).

Figure 15:
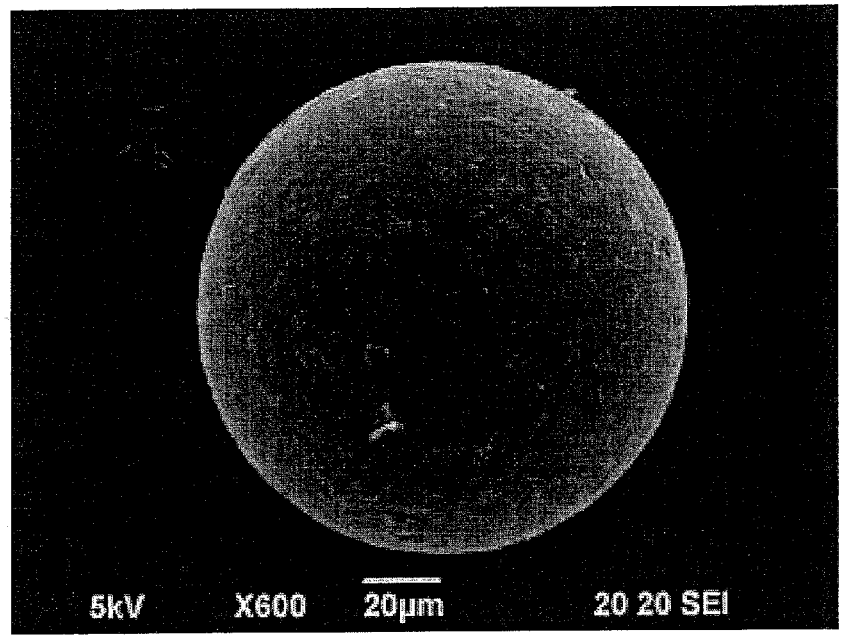
FIG. 15 is a scanning electron micrograph (600×) of a fine particle after 1 g of fine particles comprising mainly a copolymer of polystyrene and 2-hydroxyethyl methacrylate (product number CS-10 manufactured by Sekisui Plastics Co., Ltd.) and 0.001 g of exfoliated graphite obtained in Experimental Example 3 are mixed, and supercritical carbon dioxide (55° C., 276 MPa) is allowed to act for 4 hours.
Figure 16:
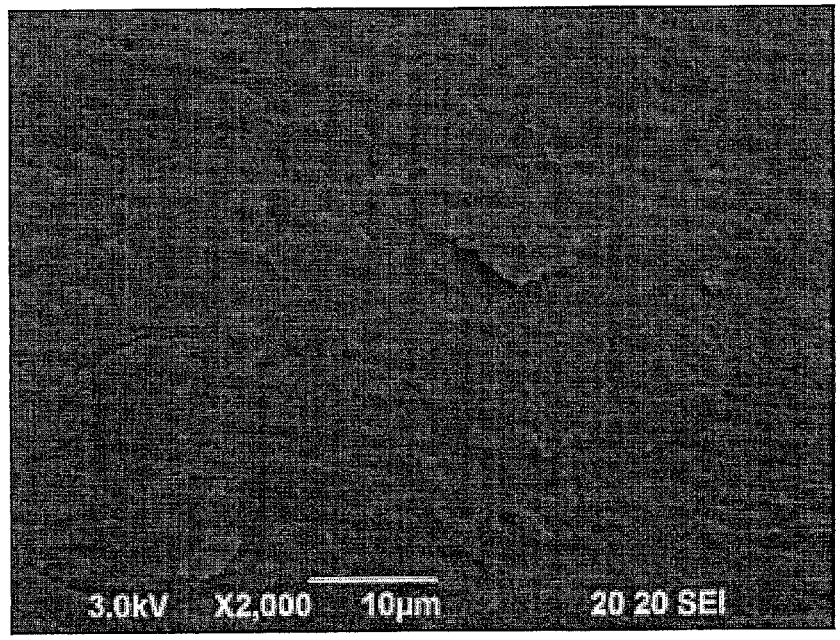
FIG. 16 is a scanning electron micrograph (2000×) of a fine particle after 1 g of fine particles comprising mainly a copolymer of polystyrene and 2-hydroxyethyl methacrylate (product number CS-10 manufactured by Sekisui Plastics Co., Ltd.) and 0.001 g of exfoliated graphite obtained in Experimental Example 3 are mixed, and supercritical carbon dioxide (55° C., 27.6 MPa) is allowed to act for 4 hours.

FIG. 15 and FIG. 16 are respectively 600× and 2000× scanning electron micrographs of the particle as the composite material obtained in Example 6. From the photographs in FIGS. 15 to 16, it is found that part of graphene-like carbon enters inside the surface of the original substrate particle comprising a resin.

Example 7

A composite material was obtained as in Example 1 except that 1.0 g of a substrate comprising a resin similar to that of Example 1 and 0.001 g of the exfoliated graphite obtained in Experimental Example 4 were mixed, and the temperature was raised to 50° C., and the mixture was stirred for 10 hours. The pressure during the mixing rose to about 27.6 MPa. The surfaces of particles as the obtained composite material were observed by a scanning electron microscope (JCM-5700 manufactured by JEOL Ltd.).

Figure 17:
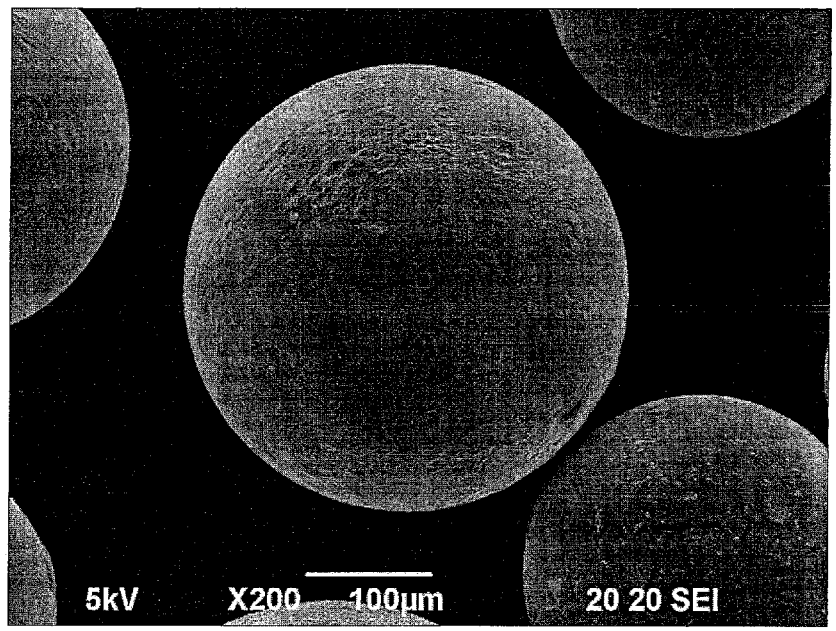
FIG. 17 is a scanning electron micrograph (200×) of a fine particle after 1 g of polystyrene fine particles (product number S-20 manufactured by Sekisui Plastics Co., Ltd.) and 0.001 g of exfoliated graphite obtained in Experimental Example 4 are mixed, and supercritical carbon dioxide (50° C., 27.6 MPa) is allowed to act for 10 hours.
Figure 18:
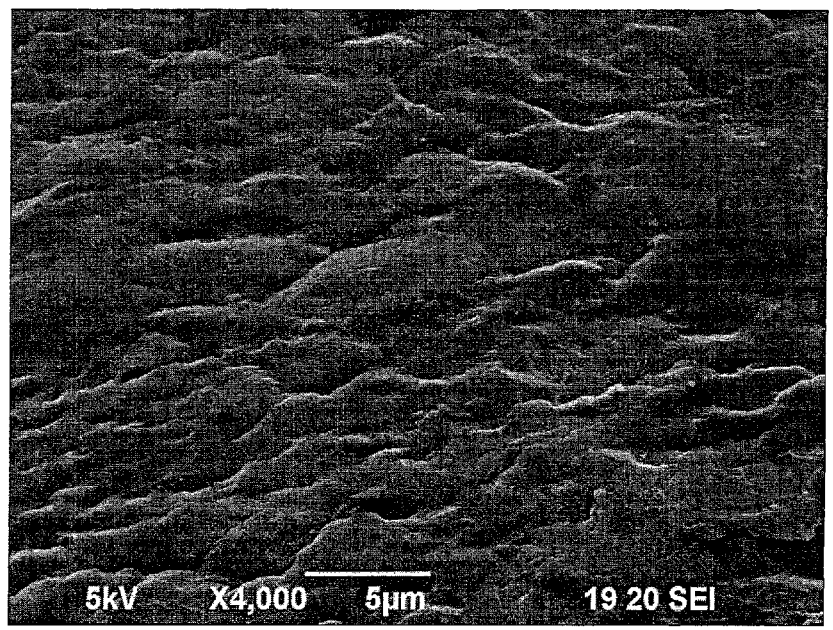
FIG. 18 is a scanning electron micrograph (4000×) of a fine particle after 1 g of polystyrene fine particles (product number S-20 manufactured by Sekisui Plastics Co., Ltd.) and 0.001 g of exfoliated graphite obtained in Experimental Example 4 are mixed, and supercritical carbon dioxide (50° C., 27.6 MPa) is allowed to act for 10 hours.
Figure 19:
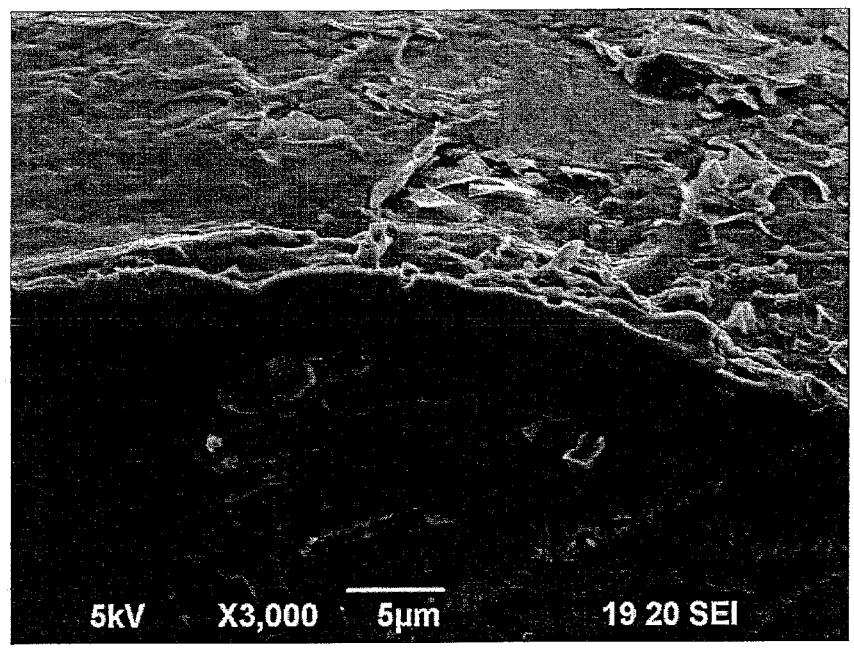
FIG. 19 is a scanning electron micrograph (3000×) of a fine particle partially cut using a mortar after 1 g of polystyrene fine particles (product number S-20 manufactured by Sekisui Plastics Co., Ltd.) and 0.001 g of exfoliated graphite obtained in Experimental Example 4 are mixed, and supercritical carbon dioxide (50° C., 27.6 MPa) is allowed to act for 10 hours.

FIG. 17 and FIG. 18 are respectively 200× and 4000× scanning electron micrographs of the particle as the composite material obtained in Example 7. The above particles were partially cut using a mortar, and the partially cut particles were also observed by the scanning electron microscope (JCM-5700 manufactured by JEOL Ltd.). FIG. 19 shows a scanning electron micrograph at 3000× magnification obtained in this manner. From the photographs in FIGS. 17 to 19, it is found that part of graphene-like carbon enters inside the surface of the original substrate particle comprising a resin.

Example 8

A composite material was obtained as in Example 2 except that 1.0 g of a substrate comprising a resin similar to that of Example 2 and 0.002 g of the exfoliated graphite obtained in Experimental Example 4 were mixed, and the temperature was raised to 40° C., and the mixture was stirred for 6 hours. The pressure during the mixing rose to about 27.6 MPa. The surfaces of particles as the obtained composite material were observed by a scanning electron microscope (JCM-5700 manufactured by JEOL Ltd.).

Figure 20:
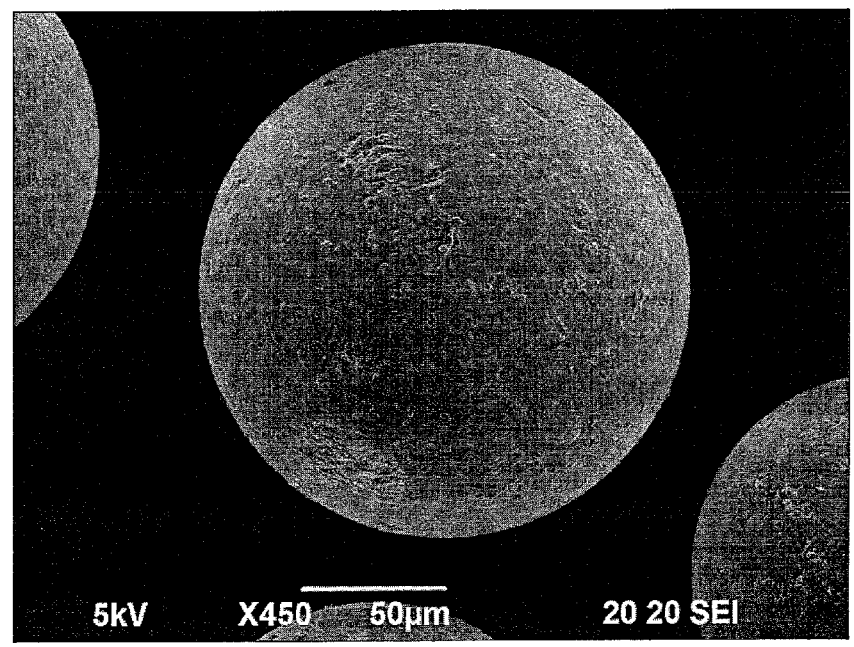
FIG. 20 is a scanning electron micrograph (450×) of a fine particle after 1 g of fine particles comprising mainly a copolymer of polystyrene and 2-hydroxyethyl methacrylate (product number CS-10 manufactured by Sekisui Plastics Co., Ltd.) and 0.002 g of exfoliated graphite obtained in Experimental Example 4 are mixed, and supercritical carbon dioxide (40° C., 27.6 MPa) is allowed to act for 6 hours.
Figure 21:
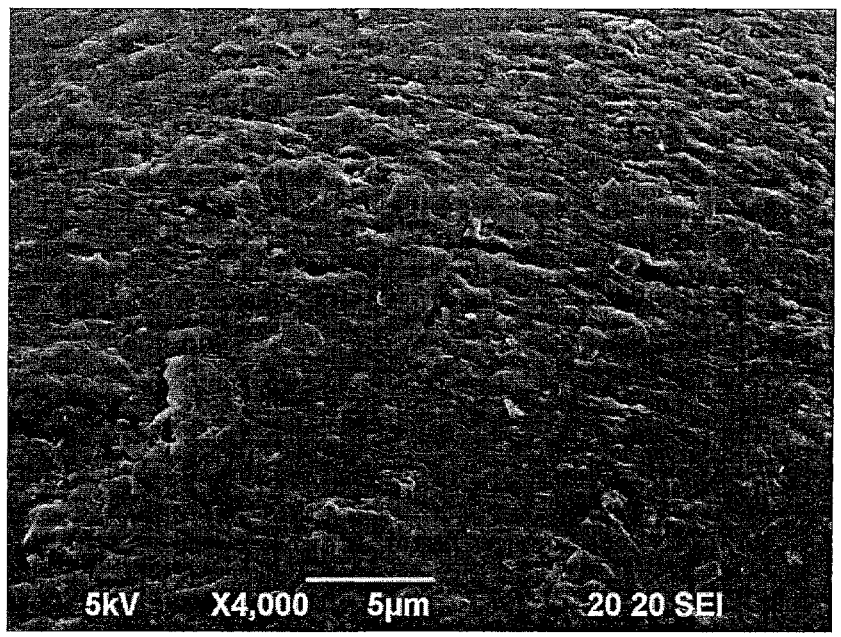
FIG. 21 is a scanning electron micrograph (4000×) of a fine particle after 1 g of fine particles comprising mainly a copolymer of polystyrene and 2-hydroxyethyl methacrylate (product number CS-10 manufactured by Sekisui Plastics Co., Ltd.) and 0.002 g of exfoliated graphite obtained in Experimental Example 4 are mixed, and supercritical carbon dioxide (40° C., 27.6 MPa) is allowed to act for 6 hours.
Figure 22:
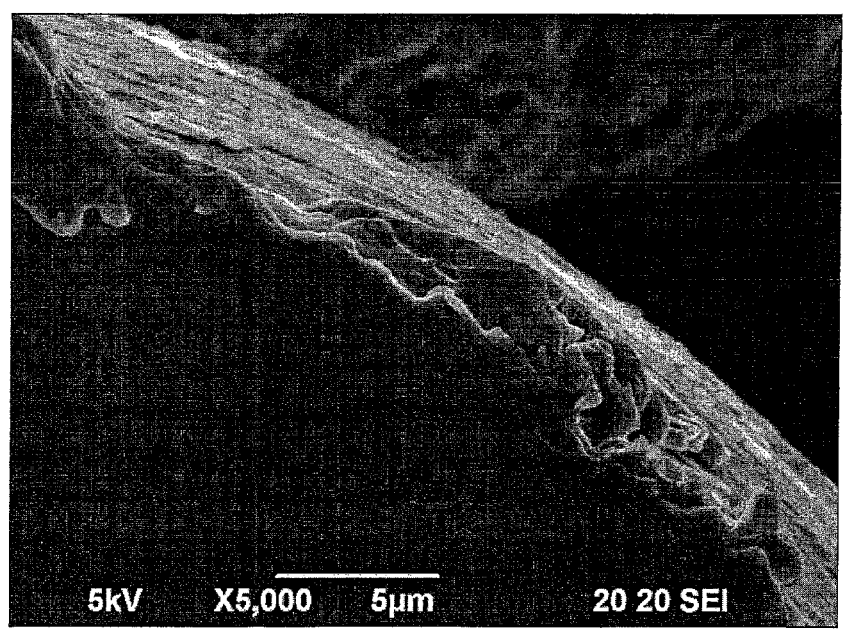
FIG. 22 is a scanning electron micrograph (5000×) of a fine particle partially cut using a mortar after 1 g of fine particles comprising mainly a copolymer of polystyrene and 2-hydroxyethyl methacrylate (product number CS-10 manufactured by Sekisui Plastics Co., Ltd.) and 0.002 g of exfoliated graphite obtained in Experimental Example 4 are mixed, and supercritical carbon dioxide (40° C., 27.6 MPa) is allowed to act for 6 hours.

FIG. 20 and FIG. 21 are respectively 450× and 4000× scanning electron micrographs of the particle as the composite material obtained in Example 8. The above particles were partially cut using a mortar, and the partially cut particles were also observed by the scanning electron microscope (JCM-5700 manufactured by JEOL Ltd.). FIG. 22 shows a scanning electron micrograph at 5000× magnification obtained in this manner. From the photographs in FIGS. 20 to 22, it is found that part of graphene-like carbon enters inside the surface of the original substrate particle comprising a resin.

The invention claimed is:

1. A composite material comprising a substrate comprising a resin, and a carbon material layer provided so as to cover at least part of a surface of the substrate,
   the carbon material layer being composed of a carbon material comprising graphene or a stack of a plurality of graphene layers obtained by pyrolyzing a polymer in a composition in which the polymer is fixed to graphite or primary exfoliated graphite;
wherein part of the carbon material enters an interior of the substrate from the surface of the substrate.

2. The composite material according to claim 1, wherein the carbon material comprises the polymer, and
a pyrolysis initiation temperature and pyrolysis end temperature of the polymer contained in the carbon material are higher than a pyrolysis initiation temperature and pyrolysis end temperature of the polymer before the fixation, respectively.

3. The composite material according to claim 1, wherein the carbon material does not comprise the polymer.

4. The composite material according to claim 1, wherein the substrate comprising, a resin is resin fine particles, and the carbon material layer is formed so as to cover outer surfaces of the resin fine particles.

5. The composite material according to claim 1, wherein the substrate comprising a resin is a sheet, and the carbon material layer is provided on at least one surface of the sheet.

6. A method for producing the composite material according to claim 1, comprising steps of:

providing a substrate comprising a resin, and a carbon material; and bringing the carbon material into contact with at least part of a surface of the substrate comprising a resin, and performing beating while allowing a fluid in a supercritical or subcritical state to act, wherein the step of providing a carbon material is performed by pyrolyzing a polymer in a composition in Which the polymer is fixed to graphite or primary exfoliated graphite.

7. The method for producing the composite material according to claim 6, wherein as the supercritical or subcritical fluid, $CO_2$ in a supercritical or subcritical state is used.

* * * * *